United States Patent Office

3,644,519
Patented Feb. 22, 1972

---

3,644,519
BIS(2-FLUORO-2,2-DINITROETHYL AMIDES
Horst G. Adolph, Beltsville, and Mortimer J. Kamlet, Silver Spring, Md., assignors to the United States of America as represented by the Secretary of the Navy
No Drawing. Filed Jan. 2, 1969, Ser. No. 790,509
Int. Cl. C07c *103/30*
U.S. Cl. 260—561 K       2 Claims

ABSTRACT OF THE DISCLOSURE

Amides of 2-fluoro-2,2-dinitroethylamine formed by reacting 2-fluoro-2,2-dinitroethylamine with a mono- or bifunctional acid halide in the presence of pyridine.

BACKGROUND OF THE INVENTION

This invention relates generally to the derivatives of 2-fluoro-2,2-dinitroethylamine and more specifically to the amide derivative.

Compounds containing fluorodinitromethyl groups have been shown generally to exhibit properties of reduced sensitivity to impact and improved thermal stability without an excessive sacrifice of explosive power. Good examples of such compounds are the 4-fluoro-4,4-dinitrobutyric acid and its esters, which are described in U.S. Pat. 3,356,714.

SUMMARY OF THE INVENTION

Accordingly, an object of this invention is to provide novel fluorodinitro compounds.

Another object of the invention is to provide highly thermally stable explosives.

Briefly, in accordance with this invention, these and other objects are attained by reacting 2-fluoro-2,2-dinitroethylamine with an acid halide in the presence of pyridine.

DESCRIPTION OF THE PREFERRED EMBODIMENTS

The preparation of the compounds which are within the scope of the invention involves the use of 2-fluoro-2,2-dinitroethylamine as a starting material. This compound can be made by various methods as disclosed in copending application, Ser. No. 790,510, filed Jan. 2, 1969. The amine is then reacted with any acid chloride, either mono- or bifunctional, under basic conditions to obtain the resulting amide. The following examples are included for purposes of illustration and are not intended to limit the scope of the invention.

EXAMPLE I

Phosgene gas is bubbled for a period of 2 hours into a refluxing solution of 5.1 g. of 2-fluoro-2,2-dinitroethylamine and 3.0 g. of pyridine in 50 ml. of methylene chloride. After the reaction is completed, petroleum ether is added and the product is filtered off and washed thoroughly with water to give 5.1 g. (92% yield) of bis(2-fluoro-2,2-dinitroethyl) urea. The melting point of the product after recrystallization from an ethyl acetate-toluene mixture is 185–6° C.

Analysis for $C_5H_6F_2N_6O_9$.—Calculated: N, 25.31%; F, 11.42%; MW, 332. Found: N, 25.3%; F, 11.6%; MW (MEK) 325.

EXAMPLE II 2.85 g. of oxalyl chloride in 10 ml. of methylene chloride is added to a solution of 6.9 g. 2-fluoro-2,2-dinitroethylamine and 3.55 g. of pyridine in 60 ml. of methylene chloride. This mixture is then stirred for 3 hours at room temperature, refluxed for 1 hour and poured into dilute sulfuric acid. The methylene chloride is evaporated and the crude product filtered off. The product obtained was 7.4 g. (91%) bis(2-fluoro-2,2-dinitroethyl) oxamide which melted after recrystallization from chloroform-acetone at 224–5° C.

Analysis for $C_6H_6F_2N_6O_{10}$. — Calculated (percent) N, 23.34; F, 10.55. Found (percent): N, 22.6; F, 10.6.

EXAMPLE III

The same procedure is followed as in Example II except that malonyl chloride in dry methylene chloride is used in place of oxalyl chloride and the residue is washed with water. The product bis(2-fluoro-2,2-dinitroethyl) malonamide is obtained in over 90% yield.

Many of the resulting amides not only exhibit excellent thermal stability at temperatures up to and above 200° C. but they have high densities which indicate that the compounds would be of use where high detonation pressures are desired. For example, the oxamide in Example II can withstand heating to 150° C. for at least 168 hours, to 180° C. for at least 72 hours and to 200° C. for several hours without visible signs of decomposition, an appreciable weight loss or a depression in melting point. The crystal density of the compounds prepared in Examples I and II are 1.86 and 1.90 respectively.

Various acid halides can be used in the practice of this invention. For example, acid bromides may be used in place of the acid chlorides of the examples. Also other dibasic acid halides are alternatives and they include such compounds as succinyl and glutaryl halides.

Obviously, numerous other modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. The compound, bis(2-fluoro-2,2-dinitroethyl) oxamide.

2. The compound, bis(2-fluoro-2,2-dinitroethyl) malonamide.

References Cited

UNITED STATES PATENTS 3,000,945   9/1961   Frankel _____ 260—561

ELBERT L. ROBERTS, Primary Examiner

E. G. LOVE, Assistant Examiner

U.S. Cl. X.R.

260—553 R